United States Patent [19]
Hofmann

[11] Patent Number: 4,793,287
[45] Date of Patent: Dec. 27, 1988

[54] FARROWING STATION WITH AN ELECTRONIC CONTROL

[76] Inventor: Helmut Hofmann, Postgasse 6, 8671 Köditz, Fed. Rep. of Germany

[21] Appl. No.: 851,075
[22] PCT Filed: Jun. 25, 1985
[86] PCT No.: PCT/DE85/00211
§ 371 Date: Apr. 14, 1986
§ 102(e) Date: Apr. 14, 1986
[87] PCT Pub. No.: WO86/00192
PCT Pub. Date: Jan. 16, 1986

[30] Foreign Application Priority Data
Jun. 27, 1984 [DE] Fed. Rep. of Germany ....... 3423627

[51] Int. Cl.⁴ .............................................. A01K 1/02
[52] U.S. Cl. ...................................................... 119/20
[58] Field of Search ................... 119/16, 20, 27, 28, 119/51.12, 51 R, 45 A, 48, 74

[56] References Cited

U.S. PATENT DOCUMENTS

| | | | |
|---|---|---|---|
| 1,361,660 | 4/1919 | Adix et al. | 119/20 |
| 3,530,831 | 10/1968 | Conover | 119/28 |
| 4,173,947 | 12/1980 | Whiteside, Jr. | 119/20 |
| 4,292,927 | 10/1981 | Sassman | 119/28 X |
| 4,314,527 | 2/1982 | Shaw | 119/16 |
| 4,630,569 | 12/1986 | Dieleman | 119/74 |

FOREIGN PATENT DOCUMENTS

| | | | |
|---|---|---|---|
| 3403930 | 8/1985 | Fed. Rep. of Germany . | |
| 325325 | 12/1928 | United Kingdom | 119/16 |
| 932189 | 5/1958 | United Kingdom . | |

*Primary Examiner*—Robert Peshock
*Assistant Examiner*—R. Thomas Price
*Attorney, Agent, or Firm*—Barnes & Thornburg

[57] ABSTRACT

A farrowing station for sows is provided which includes a first floor for the sow. At least one lateral floor section for piglets is provided on a portion of the perimeter of the first floor. The lateral floor sections and the first floor are movable to different levels with respect to one another. Lifting and lowering elements are provided for moving at least one of the first floor and the lateral floor sections to the different levels. The lifting and lowering elements are disposed under at least one of the first floor and the lateral floor sections. Protecting matting elements are provided which are impermeable to liquid disposed on at least a portion of the first floor and the lateral floor sections for protecting the animals from injury and protecting the lifting and lowering elements from soiling or exposure to liquid.

37 Claims, 6 Drawing Sheets

FARROWING STATION WITH AN ELECTRONIC CONTROL

BACKGROUND AND SUMMARY OF THE INVENTION

This invention relates to a farrowing box, which has the purpose of providing the sow and all newborn piglets before, during and after birth with the best prerequisites for an unmarred life. It is characterized in that the standing area for the sow and the lateral staying spaces for the piglets can be adjusted to different levels and the piglets can thus be housed fully automatically protected from the sow.

Farrowing boxes and farrowing cages are known having the following characteristics. An iron construction is designed in such a way that the sow stands between the lateral separating frames (therefore called sow separating frames) and cannot turn around. The front of the construction is formed by the trough and the iron barriers, while in the rear, a so-called piglet hoop guard forms a barrier as part of a door, unless a sow is tied up by means of stomach or shoulder belts. Known boxes differ from one another with respect to the adjusting possibilities of the separating frames or parts thereof. Some separating frames can be taken out completely in order to provide the possibility of letting the piglets stay in the farrowing box for some time after weaning from the sow. Other separating frames can be folded away laterally or upwards. Such farrowing boxes have the purpose of preventing the loss of piglets resulting from being crushed to death by the sow and of providing efficient working conditions during daily care. This is achieved mainly by the fact that the sow can deposit excrement and urine only to the rear which facilitates cleaning. By means of this arrangement, unnecessarily soiling of the space for the piglets adjacent to the sow is prevented. In addition, it is a known state of the art that the floor of the pen is made of concrete, rubber mats, wood-block paving or of slatted concrete flooring with a duct for the droppings that is located underneath. It is also known that the arranging of a nest for the piglets or the providing of thermal radiation apparatus or floor heating means is advantageous with respect to the piglets' requirements. When farrowing pens of this type are arranged, it is assumed that they must meet the requirements of the sow and the piglets from the time before birth until weaning from the sow or even until the walking stage of the piglets when body weight of more than 15 kilograms has been attained.

Requirements of the animals must be mentioned because they provide a standard on which the invention is based and are necessary for evaluating the state of the art.

The sow needs quiet and must not be disturbed by noise, by itching caused by dirt, fleas, mites, lice, by an unfulfilled nest-building instinct, by strain on the intestines or bowels, by the wrong temperatures in the pen, etc. This results in relieving the strain on the metabolism, the circulation and the nervous system and permits a quieter birth that is free of complications.

From the first moment of their lives, the piglets must be protected from being stepped on and crushed to death by the mother animal when it gets up, while standing and when it lies down.

Immediately after birth, all piglets need the important colostral milk that contains all defensive and formative substances provided by the circulatory system. (Per suck, five to eight grams of colostral milkpper line are made available within 15 to 20 seconds).

In the intervals between the nursing periods, the piglets need warm and oxygen-rich fresh air as well as a warm space where they can stay, free of drafts, hygienically clean and therefore free of germs, bacteria, viruses, fungi, flies, mites and lice, so that they can sleep and are fit for the next nursing period. In the first days of life, there are about 24 nursing periods each day.

An object of the invention is an increase in the efficiency of the piglet produciion by further reducing losses of piglets. Although the known state of the art is wide-spread and is used in most production facilities, the achieved production results are unsatisfactory. The production results (i.e., the number of piglets produced per sow per year) is a critical factor for the efficiency of piglet production. In the Federal Republic of Germany, for example, an average of 15 piglets per sow per year are produced for all soss kept. This figure is officially documented. In organized production facilities for piglets, the average figure in all government-controlled opeations is below 18, and only a few operations achieve the raising of 20 piglets per sow per year on a continuing basis.

The achieving of the above object is even more urgent since the production costs per sow per year are rising constantly and have already exceeded the market value of more than 15 piglets per sow per year (without accounting for wages due workers). Progress in pig breeding would easily make possible the producing of even more than 20 piglets per sow per year if an excessively large number of piglets did not die before birth or during the first eight days after birth, A further object of the invention is to increase the national average from less than 15 piglets to more than 20 piglets per sow per year. When examining the prerequisiees, it was found that more than 90% of all piglet losses occur in the time period of three days before birth until seven day after birth These and other objects, features, and advantages of the present invention will become more apparent from the following description when taken in connection with the accompanying drawings which show, for the purposes of illustration only, plural embodiments in accordance with the present invention.

DETAILED DESCRIPTION OF THE DRAWINGS

Figure 1:
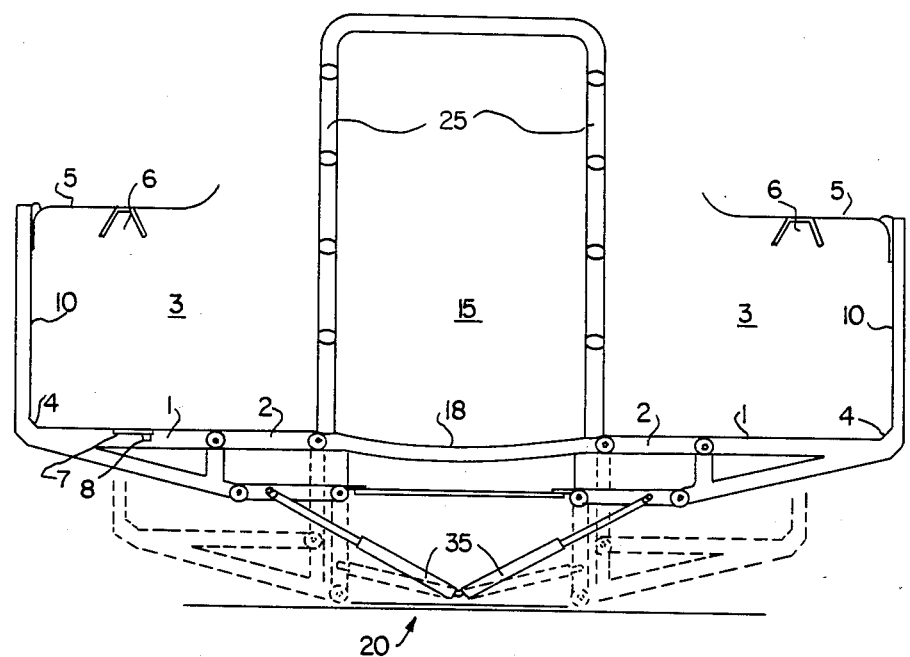
FIG. 1 shows a farrowing station according to the invention with piglet retaining areas extended.

According to certain preferred embodiments of the present invention, FIG. 1 shows a farrowing box for sows, the standing area of the sow and the lateral staying spaces for the piglets which are adjustable to different levels. According to the present invention, special arranging and installing of the electronically controllable and mechanically mobile and immobile parts provide a special "birth station" that optimally meets all special requirements of the breeding and nursing sows and of all nursing piglets. The birth station includes a lowering and raising mechanism for the animal areas arranged below the floor, a movable and transparent cover around the whole station, a self-cleaning arrangement for the station and the sow, automatically emptying and automatically filling piglet drinking troughs, fully automatic air-conditioning of the piglet nest, a computer for all operations, birth-reporting device for the piglets, and an alarm reporting system.

Figure 2:
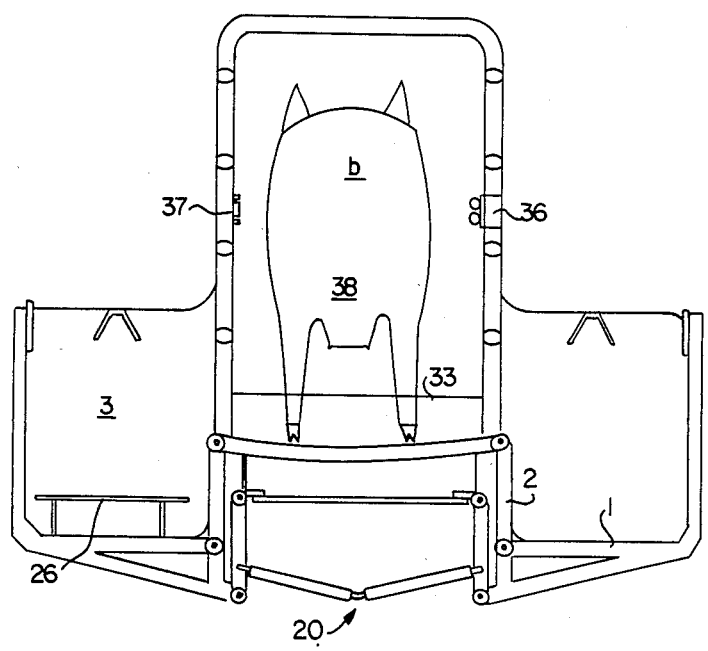
FIG. 2 shows the farrowing station of FIG. 1 with the piglet areas lowered with respeCt to the sow retaining area.
Figure 3:
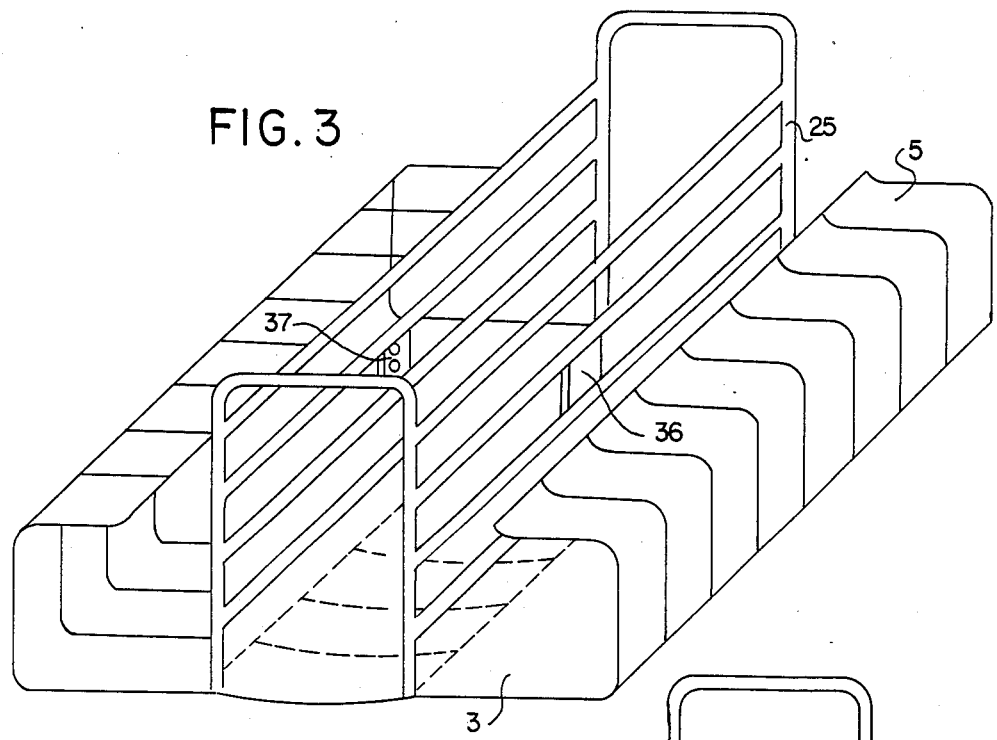
FIG. 3 shows a perspective view of the farrowing station of FIG. 1.
Figure 4:
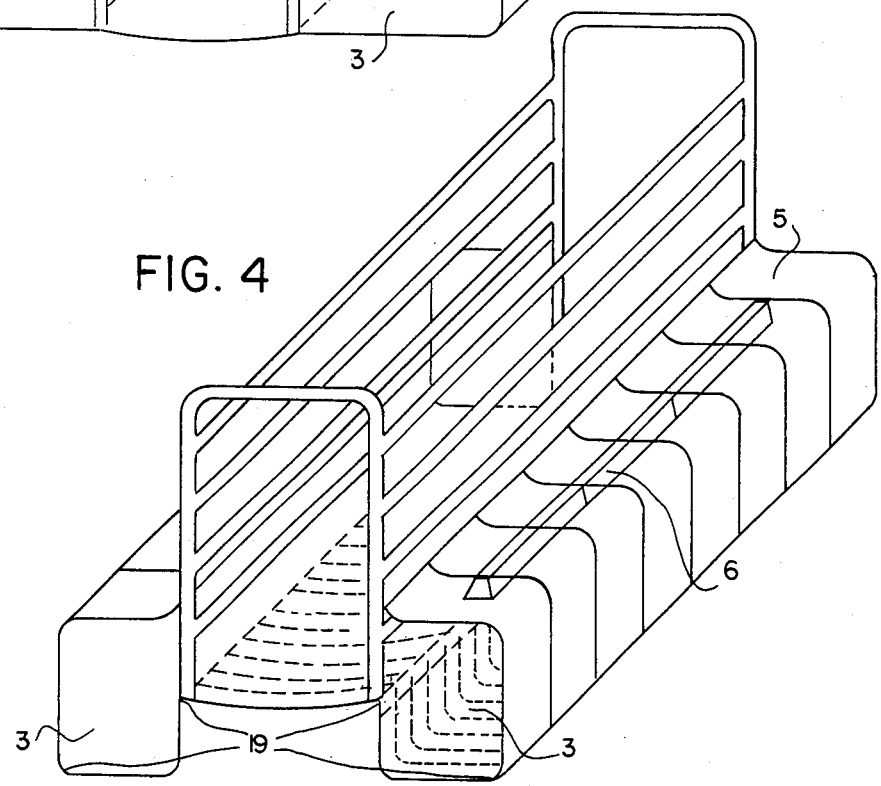
FIG. 4 shows a perspective view of the farrowing station as shown in FIG. 2.

FIGS. 1 and 2 show spaces for the piglets including two floor areas (1) developed as a parallelogram that can be hydraulically lifted and lowered from below, by arranging connecting rods (39) on the bottom for the parallel guiding of the floor areas (1), and by using two other floor areas (2) on top for the parallel guiding. The floor areas (2) are developed as floor parts that can be moved 90 degrees in such a way that, on the one hand (FIG. 1), in horizontal position, they serve as a floor and, on the other hand (FIG. 2), after the folding-down, they serve as a vertically standing wall and form an automatic catching device for the piglets that at the same time laterally encloses the piglet nest (3). The piglet nest created is closed to all sides, can be fully air-conditioned and is open in the lifted state. It is especially advantageous in this case that all mcchanical parts for the parallel guiding etc. are arranged below the floor where, by means of the continuous waterproof rubber/plastic covering (4), they are protected from being soiled by excrement and urine, etc. At the same time, above the floor, the working area of the mechanical components is kept open and thus the mechanical parts do not hinder the animals and the sty workers.

A farrowing station is provided wherein the control process of the lowering and lifting of the floor parts can be carried out by manual control as well as by a fully automatic control by means of a computer via a light barrier created by elements 36, 37 (FIG. 2). Th light barrier determines whether the sow 38 is lying or standing. When the sow 38 is standing up, the piglet floor (2) immediately folds down and locks the piglets into the nest, and lets the piglets nurse again when the sow lies down again. However, a computer can also compute and control the time periods and intervals itself. Thus, time delays, resting and nursing intervals of the piglets can be computed and controlled according to the well-being of the animals.

The whole floor area of the box as well as the lower area of the side walls include one single rubber/plastic mat 4 and thus forms a waterproof flooring.

Figure 5:
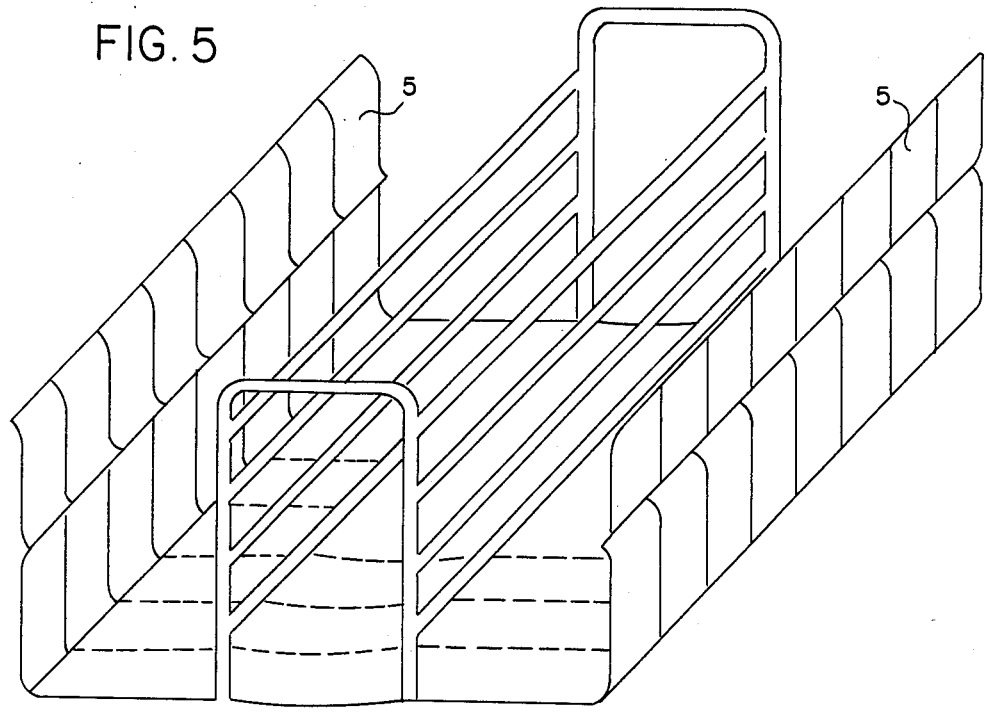
FIG. 5 shows a perspective view of the farrowing station of FIG. 1 with piglet retaining areas having the roof hinged open.
Figure 6:
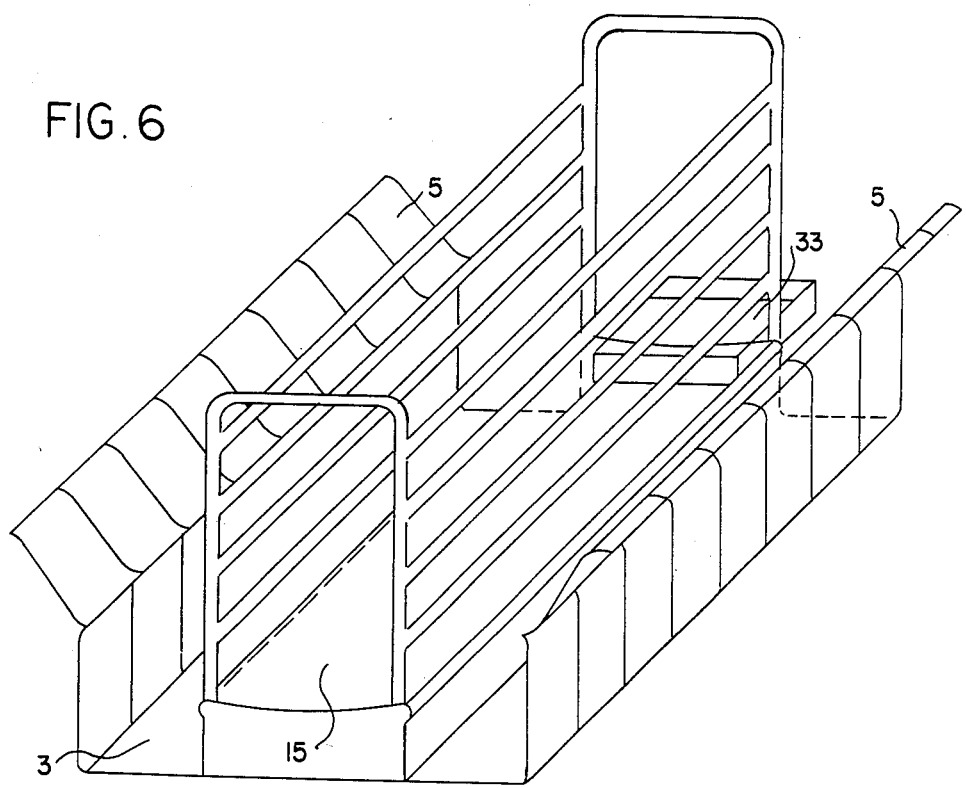
FIG. 6 shows a perspective view of the farrowing station of FIG. 2 with the piglet retaining area roofs hinged open.

The retaining area for the piglets has S-shaped plexiglass roofs 5 equipped with hinges hhat thus cover the whole area for the piglets but, otherwise, after folding-up, permit a good access to the space for the piglets (FIGS. 5 and 6).

The plexiglass roofs 5 are equipped with heat radiators 6 that are regulated by thermostats and controlled by computers.

In certain preferred embodiments, the rubber floor 4 is equipped with a heater 7 in the area for the piglets, and the heater 7 is regulated by a thermostat 8 and controlled by a computer 9.

The walls 10 as well as the ceiling 11 of the box (FIG. 7) are made of a waterproof, muffling and transparent plastic material permitting a complete air conditioning of the litter station.

In embodiments in which the walls 10 are connected to the floor parts 1 and 2, the walls 10 follow the movements of the floor parts 1 and 2. Thus, covering 12 remains permanently closed, although the position changes with the floor parts 1 and 2.

A vent 13 and a heater 14 are located above the standing area 15 of the sow. The vent 13 and heater 14 are also controlled by the computer to provide an optimal climate inside the whole litter station.

Rotating and firmly mounted water-spraying nozzles 16 are mounted inside the litter station that permit a fully automatic cleaning as well as disinfecting of the whole litter station and, if necessary, also of the sow.

A flow-proportioning means 17 for the cleaning and disinfecting agent is inserted that is also opened via the computer by means of a magnetic valve.

The standing area 15 of the sow is not level, but is arched downward (concave), and therefore forms a nest 18 for the sow.

All corners 19 in the floor area are rounded and are therefore more comfortable and safer for the animals. The rounded corners 15 also facilitate cleaning by water jets making this cleaning a more convenient operation.

Figure 8:
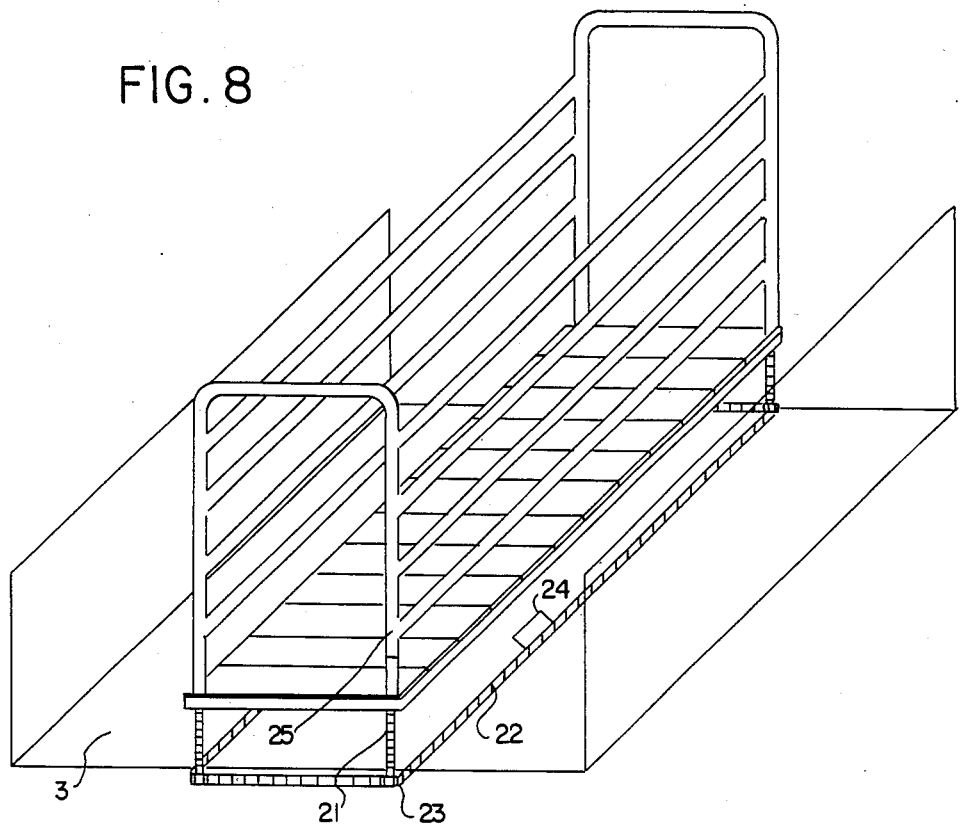
FIG. 8 shows a second embodiment of the invention employing a motor-chain system for movement of the members.
Figure 9:
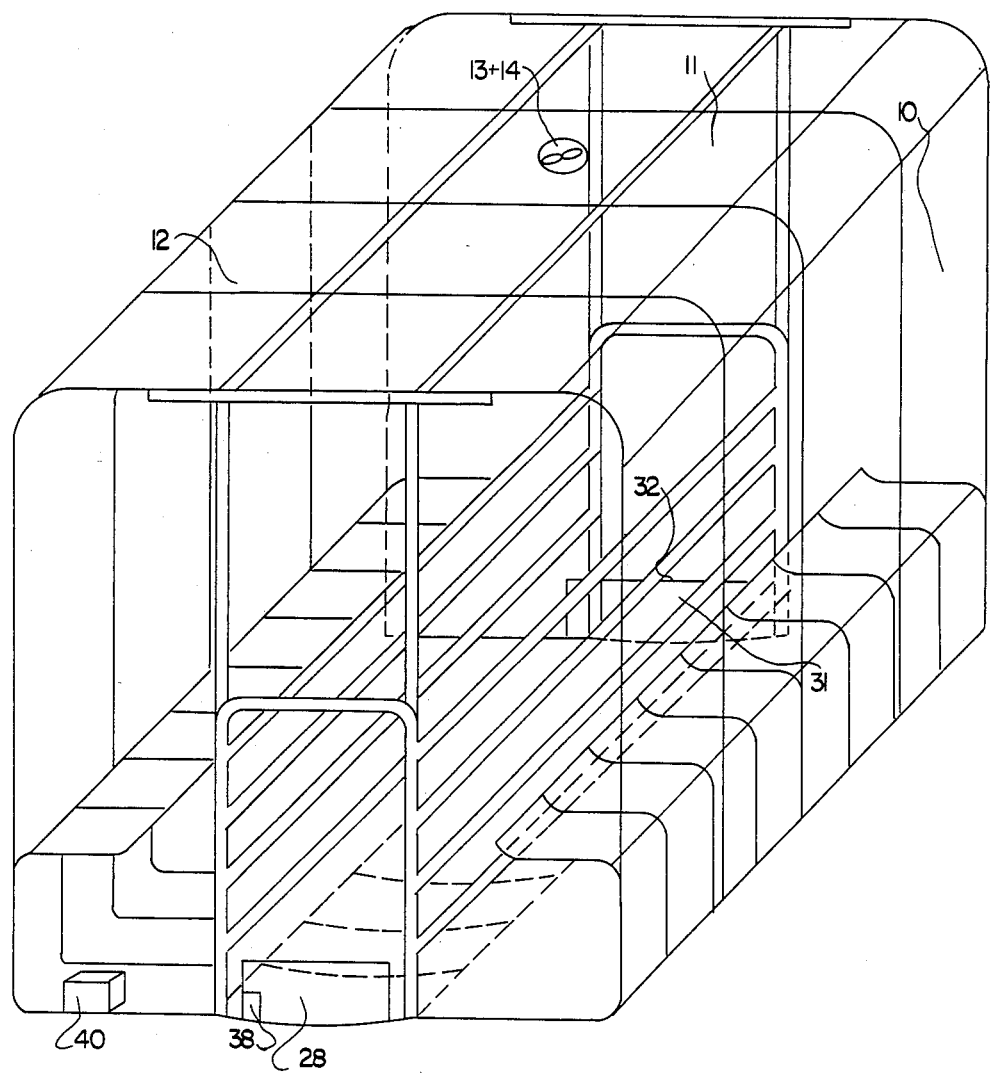
FIG. 9 shows a perspective view according to the invention with station covering, heater and vent.

According to certain advantageous embodiments of the invention, a drive system other than a hydraulic system is used for moving the floor positions. In these arrangements, as shown in FIG. 8, a spindle drive 21 having a chain 22 and a chain pinion 23 as well as a geared motor 24 may be used. A chain pinion 23 is installed in each of the four corners of the litter box separating frame stands 25. The schematically shown geared motor 24 drives the chain 22. Depending on the direction the chain 22 is driven, the chain pinions 23 move the spindle drive 21 up or down which in turn move the floor.

For reporting the birth of piglets, a device 26 is set up in the area for the piglets that triggers a switching contact only be means of a newborn piglet that is evaluated and processed by the computer. The device can report the presence of piglets by way of an alarm device.

The switching and the control of all functions may be carried out manually as well as by means of a programmable computer. If a computer is used, the computer is preferably mounted in the center above the sow separating frame toward the switching center 27.

The computer 9 of the switching center 27 may be provided with a respective program that corresponds to the respective animal type, such as a restless young sow, a normal young sow, a slow old sow, a restless old sow, a normal slow, and others, making it possible to control the different functions specifically with respect t the respective animal.

The feeding as well as the furnishing of drinking water may also be controlled by a computer. For this purpose, a clock and special sensors 38 in the feeding trough 28 would be provided.

For ventilating the piglet nest with fresh air, a separate fan 34 is provided that pushes fresh air into the sow separating frame. From the sow separating frame, the air is discharged via outlet nozzles 29 arranged at the lower tube 30 of the sow separating frame (FIG. 7).

Figure 7:
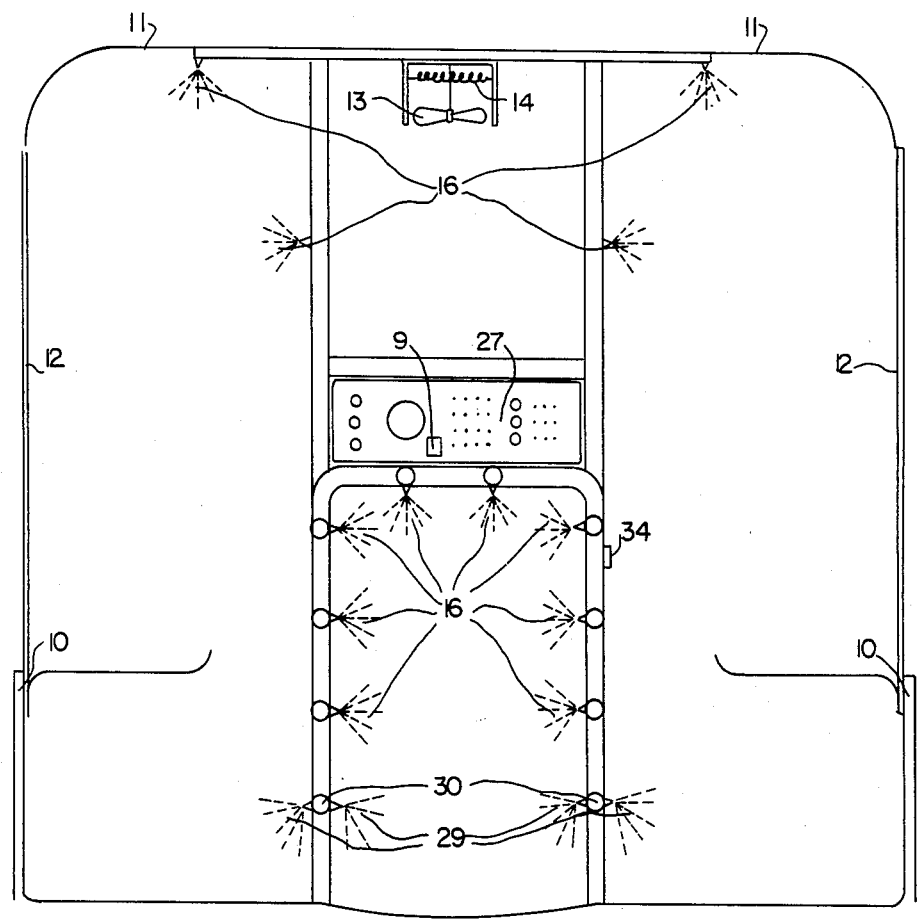
FIG. 7 shows the control configuration for the farrowing station according to the invention.

The entrance step 31 into the box may also serve as a hoop guard 32 for the piglets when it is swivelled upward (FIG. 7).

A trough-shaped place of deposit 33 is developed on top between two sow separating frames, at the rear part of the box. It is contemplated that the place of deposit can serve as an operating deposit, a case for required obstetric material and at the same time, as a wash basin. The wash basin can be folded over as a coeer, serving as a tight covering of the place of deposit.

In certain embodiments, a closed hydraulic system is used that is equipped with a geared motor, an electric shut-off valve and is controlled by a computer.

The hydraulic cylinders 35 are arranged opposite one another and thus support one another, which helps reduce the costs of construction.

The rubber floor mat 4 in the area 18 for the sow as well as in the area 1 for the piglets is tightly screwed to the base while it is not fastened at the floor part 2. Thus, when the floor part 2 swivels, the floor mat 4 can slide on the base, and the mat 4 shapes itself around the corners without having to expand.

A water trough 40 is provided for the piglets that always carries a small amount of fresh water. The water trough assembly is controlled by the computer which controls an intermittent filling by means of a thrust-type impact of water, which at the same time rinses and clears out the old water. The initial amount of water is pressed into the water bowl at a high pressure and thus rinses out the content, while the amount of water for the refilling follows at a low pressure and remains in the bowl.

The two movable areas 1, 2 and 3 for the piglets may be lifted separately and individually as well as alternately This makes it possible to alternate nursing periods for separate groups of a large litter of piglets. For example , a litter of 18 piglets can be divided into thre groups and nine piglets may be alternately brought to the sow for nursing.

The computer program can control all other functions of the station, including any functions not discussed herein. Other functions contemplated that can be controlled automatically by the computer include the washing of the animals, and a subsequent drying by means of the ventilating system 13 and the heater 14 of the box. Further automatic functions are also contemplated such as a spray treatment of a medication applied to the skin, such as a medication against worms or skin parasites.

While I have shown and described plural embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A farrowing station assembly having a cage for a mother animal such as a sow including a first floor, comprising:

at least one lateral floor section for piglets on at least a portion of an outside perimeter of said first floor, said at least one lateral floor section and said first floor being movable to different levels with respect to one another in an upward and downward direction;

lifting and lowering means for moving at least one of said first floor and said at least one lateral floor section to said different levels, said lifting and lowering means being disposed under at least one of said first floor and said at least one lateral floor section on a side opposite the mother animal; and protecting matting means impermeable to liquid disposed on at least a portion of said first floor and said at least one lateral floor section for protecting the animals from injury and protecting said lifting and lowering means from soiling or exposure to liquid.

2. A farrowing station according to claim 1, wherein the protecting matting means includes;

a heater for heating a nest area of the piglets,
a thermostat for regulating said heater and
computer means for controlling the heater.

3. A farrowing station according to claim 1, further comprising
side walls and a ceiling of the station comprised of a waterproof, muffling and transparent material permitting air conditioning of the farrowing.

4. A farrowing station according to claim 1, further comprising
a vent and a heater located above said first floor said vent and heater being activated respectively under control of a computer for an optimal climate inside the farrowing station.

5. A farrowing station according to claim 1, further comprising
a cover surrounding the farrowing station, sow separating frame, rotating water-spraying nozzles mounted to at least one of said sow separating frame and said cover to provide a fully automatic cleaning as well as disinfecting of the farrowing station and the sow.

6. A farrowing station according to claim 5, further comprising
a flow-proportioning means connected to said nozzles for introducing a cleaning and disinfecting agent to said nozzles, and
a magnetic valve means responsive to a computer for activating said flow-proportional means.

7. A farrowing station according to claim 5, wherein said first floor and a first and second portions of each of said at least one lateral floor sections include side edges, said side edges being rounded for greater comfort and safety for the animals and to admit effective cleaning by water sprayed from said nozzles.

8. A farrowing station according to claim 1, wherein the first floor for the sow is concave to form a nest for the sow.

9. A farrowing station according to claim 1, further including reporting means for reporting the birth of piglets responsive to a newborn piglet to trigger a switching contact to actuate processing by a computer.

10. A farrowing station according to claim 1, further comprising
a sow separating frame above said first floor, means for ventilating the sow separating frame, outlet nozzles arranged at a lower area of the sow separating frame for exhausting air from said sow separating frame.

11. A farrowing station according to claim 1, further comprising
an entrance step into the station swivelable upwardly to form a hoop guard for the piglets.

12. A farrowing station according to claim 1, having plural sow separating frames and further comprising
a trough-shaped means mounted between two sow separating frames, at a rear part of the station, to form a repository for obstetric material and
a foldable member which in a first position serves as a cover for the trough-shaped means and in a second position as a wash-basin.

13. A farrowing station according to claim 1, further including
a motor means for actuating said lifting and lowering means,
a closed hydraulic system for activating said motor means,
a shut-off valve means for controlling said hydraulic system in response to a signal from a computer means.

14. A farrowing station according to claim 13, including at least one sow separating frame separating the sow from piglets, wherein the hydraulic system comprises
plural hydraulic cyulinders with first respective ends of each mounted together to said sow separating frame and second respective ends of each mounted to respective lateral floor sections, said
hydraulic cylinders being arranged opposite one another to support one another in order to minimize construction expense.

15. A farrowing station according to claim 1, further comprising, a computer means
a water trough for the piglets,
means responsive to said computer means for inputting water to said water trough alternately in the form of a pulse flow of predetermined pressure for flushing old water out of the water trough and in the form of continuous flow of a pressure lower than the predetermined flushing pressure for filling said water trough.

16. A farrowing station according to claim 1, wherein said at least one lateral floor section includes a first portion closest to said first floor and a second portion spaced from said first floor pivotable relative to one another;
in a first position, both portions forming a floor area for the piglets adjacent said first floor, and
in a second position, said first portion forming a wall extending down from said first floor to said second portion and said second portion forming a floor for the piglets spaced downwardly from said first floor.

17. A farrowing station according to claim 16, wherein said lifting and lowering means includes hydraulic means for moving said at least one lateral floor section first and second portions back and forth between said first position and said second position.

18. A farrowing station according to claim 16, further including a piglet nest including:
an outer wall spaced from said first floor extending upward from said second portion of each of said at least one lateral floor sections;
a roof extending from each of said outer walls toward said first floor spaced above said second portion;
in said first position, both said first and second portions of each of said at least one lateral floor sections forming a floor of said piglet nest, and in said second position, said first portion forming a wall opposite said outer wall of said piglet nest extending down from said first floor to said second portion and said second portion forming a floor of said piglet nest.

19. A farrowing station according to claim 16, further comprising:
light barrier means disposed above said first floor for detecting an upright and a prone position of the mother animal;
computer means for automatically controlling said lifting and lower means, said computer means being responsive to said light barrier means such that said at least one lateral floor section first and second portions are moved automatically to said first position in response to a light barrier means detection of a mother animal prone position and are moved to said second position in response to a light barrier means detection of a mother animal upright position, said computer means further including means for computing and establishing time periods for controlling resting and nursing intervals of the animals; and
manual control means for manually controlling said lifting and lowering means alternative to said computer.

20. A farrowing station as in claim 16, wherein said protecting matting means comprises a single waterproof mat covering said first floor and said first and second portions of each of said at least one lateral floor sections, said mat being movable with said first and second portions back and forth between said first and second positions.

21. A farrowing station as in claim 16, further including:
an S-shaped plexiglass roof covering over each of said at least one lateral floor sections;
at least one side wall extending up from each of said at least one lateral floor sections and a roof extending from said at least one side wall; and
hinge means for hingedly connecting said roof to said at least one side wall, said roof being pivotable at said hinge means to a first position covering each of said at least one lateral floor sections and a second position permitting access to each of said at least one lateral floor sections.

22. A farrowing station according to claim 21, wherein the roof is equipped with at least one heat radiator and further comprising
thermostat means for said radiator means and
computer means for controlling the radiator.

23. A farrowing station according to claim 21, further comprising a cover surrounding the farrowing station, said at least one side wall remaining fixed to said at least one lateral floor section and moving with said at least one lateral floor section between said first and second positions.

24. A farrowing station according to claim 16, wherein said lifting and lower means comprise a spindle drive device including
a chain, a motor for driving said chain in a first and second direction and a chain pinion for converting motion of said driven chain into an upward motion in response to said first direction and into a downward motion in response to said second direction.

25. A farrowing station according to claim 16, wherein said protecting matting means is fixedly mounted to said first floor and said second portion of each of said at least one lateral floor sections and is movally disposed on said first portion of each of said at least one lateral floor sections, such that said protecting matting means slides with respect to said first portion to conform with the movement back and forth between said first and second positions.

26. A farrowing station as in claim 16, including a plurality of lateral floor sections, said lifting and lowering means including activating means for activating each of said lateral floor sections back and forth between said first and second positions independently from one another, and for activating the movement of each lateral floor section at separate independent intervals.

27. A farrowing station according to claim 1, wherein said cage for the mother animal comprises a sow separating frame separating the sow from piglets, said station further comprising:
  drinking troughs for the animals;
  self-cleaning means for the station for automatically emptying and automatically filling said drinking troughs;
  automatic air-conditioning means for the farrowing station;
  birth reporting means for reporting birth of piglets;
  computer means for controlling said lifting and lowering means, said self-cleaning means, said air conditioning means and said birth reporting means;
  a switching center, said computer means being disposed above said sow seprating frame at said switch center.

28. A farrowing station according to claim 27, wherein the computer means of the switching center is provided with a program means that corresponds to an animal type, comprising one of a group consisting of at least a restless young sow, a normal young sow, a slow old sow, a restless old sow, a normal sow, for controlling the adjusting means, self-cleaning arrangement and air conditioning means.

29. A farrowing station according to claim 27, wherein the computer means includes a program means that controls the functions of
  washing of the sow, drying the sow after washing by means of application of warm air to the station, and
  spraying an antiparasite/worm medication applied to the skin of the sow.

30. A farrowing station as in claim 27, further including a feeding trough and sensor means in said feeding trough for detecting a level of food in said feeding trough, and said computer further including clock means and means responsive to said sensor means, said computer controlling the placing of food in said feeding trough by at least one of said means responsive to said sensor means and said clock means.

31. A farrowing station according to claim 1, further including first and a second portion of each of said at least lateral floor sections and an outer wall spaced from said first floor extending upward from said second portion of each of said at least one lateral floor sections, said protective matting means comprising a single waterproof mat covering said first floor, said first and second portions of each of said at least one lateral floor sections and a lower portion of said outer walls closest to said second portion.

32. A farrowing station for sows having a cage for a mother animal including a first floor, comprising:
  at least one lateral floor section for piglets on at least a portion of an outside perimeter of said first floor, said at least one lateral floor section and said first floor section benng movable to different levels with respect to one another;
  lifting and lowering means for moving at least one of said first floor and said at least one lateral floor section to said different levels; and
  birth reporting means for positively reporting the presence of piglets.

33. A farrowing station having a first floor for a sow, and comprising:
  adjusting means for adjusting a level of plural lateral floors for piglet nests with respect to said first floor;
  a continuous movable flexible floor cover disposed at least on said first and lateral floors;
  a movable and transparent cover around the farrowing station;
  a self-cleaning arrangement for the station and the sow for automatically emptying and automatically filling piglet drinking torughs for the piglets;
  fully automatic air-conditioning means for the piglet nests;
  a computer means for controlling said adjusting and means, self-cleaning arrangement, and air conditioning means;
  a birth-reporting device for the piglets;
  an alarm reporting system for reporting piglet birth;
  a sow separating frame, rotating water-spraying nozzles mounted to at least one of said sow seprating frame and said cover to provide a fully automatic cleaning and disinfecting of the farrowing station and the sow;
  a flow-proportioning means connected to said nozzles for introducing a cleaning and disinfecting agent to said nozzles, and
  a magnetic valve means responsive to said computer for activating said flow-proportional means.

34. A farrowing station having a first floor for a sow, and comprising:
  adjusting means for adjusting a level of plural lateral floors for piglet nests with respect to said first floor;
  a continuous movable flexible floor cover disposed at least on said first and lateral floors;
  a movable and transparent cover around the farrowing station;
  a self-cleaning arrangement for the station and the sow for automatically emptying and automatically filling piglet drinking troughs for the piglets;
  fully automatic air-conditioning means for the piglet nests;
  a computer means for controlling said adjusting means, self-cleaning arrangement, and air conditioning means;
  a birth-reporting device for the piglets, and an alarm reporting system for reporting piglet birth, said birth-reporting device including means responsive to a newborn piglet to trigger a switching contact to activate processing by the computer means.

35. A farrowing station having a first floor for a sow, and comprising:
  adjusting means for adjusting a level of plural lateral floors for piglet nests with respect to said first floor;

a continuous movable flexible floor cover disposed at least on said first and lateral floors;
a movable and transparent cover around the farrowing station;
a self-cleaning arrangement for the station and the sow for automatically emptying and automatically filling piglet drinking troughs for the piglets;
fully automatic air-conditioning means for the piglet nests;
a computer means for controlling said adjusting means, self-cleaning arrangement, and air conditioning means;
a birth-reporting device for the piglets;
an alarm reporting system for reporting pglet birth;
a sow separating frame,
manual means for effecting the switching and the control of all functions as well as by means of said computer means, and wherein
the computer means is mounted in a switching center positioned above said sow separating frame, said computer means being provided with a program means that corresponds to an animal type, comprising one of a group consisting of at least a restless young sow, a normal young sow, a slow old sow, a restless old sow, a normal sow, for controlling the adjusting means, self-cleaning arrangement and air conditioning means.

36. A farrowing station having a first floor for a sow, and comprising:
adjusting means for adjusting a level of plural lateral floors for piglet nests with respect to said first floor;
a continuous movable flexible floor cover disposed at least on said first and lateral floors;
a moveable and transparent cover around the farrowing station;
a self-cleaning arrangement for the station and the sow for automatically emptying and automatically filling piglet drinking troughs for the piglets;
fully automatic air-conditioning means for the piglet nests;
a computer means for controlling said adjusting means, self-cleaning arrangement, and air conditioning means;
a birth-reporting device for the piglets;
an alarm reporting system for reporting piglet birth;
a plurality of sow separating frames;
a trough-shaped means mounted between two sow separating frames, at a rear part of the station, to form a repository for obstetric material; and
a foldable member which in a first position serves as a cover for the trough-shaped means and in a second position serves as a wash-basin.

37. A farrowing station having a first floor for a sow, and comprising:
adjusting means for adjusting a level of plural lateral floors for piglet nests with respect to said first floor, each of said plural lateral floors including a first portion closes to said first floor and a second portion spaced from said first floor pivotable relative to one another such that in a first position, both portions form a floor area for the piglets adjacent said first floor, and in a second position, said first portion forms a wall extending down from said first floor to said second portion and said second portion forms a floor for the piglets spaced downwardly from said first floor, said adjusting means including hydraulic means for moving said at least one lateral floor section first and second portions back and forth between said first position and said second position and including means for effecting separate and individual adjustment to said first and second positions of each lateral floor independent of the other lateral floors thereby allowing a large litter of piglets to be divided and brought alternately to the sow for nursing;
a continuous movable flexible floor cover disposed at least on said first and lateral floors;
a movable and transparent cover around the farrowing station;
a self-cleaning arrangement for the station and the sow for automatically emptying and automatically filling piglet drinking troughs for the piglets;
fully automatic air-conditioning means for the piglet nests;
a computer means for controlling said adjusting means, self-cleaning arrangement, and air conditioning means;
a birth-reporting device for the piglets; and
an alarm reporting system for reporting piglet birth.

* * * * *